United States Patent [19]

Byrd

[11] Patent Number: 5,558,378

[45] Date of Patent: Sep. 24, 1996

[54] GRAPPLING-TYPE SHOVEL

[76] Inventor: Edward Byrd, Stubbins East Ogwell, Devon, England, TQ12 6AW

[21] Appl. No.: 558,801

[22] Filed: Nov. 15, 1995

[51] Int. Cl.⁶ .................................................. A01B 1/18
[52] U.S. Cl. ........................................... 294/50.8; 294/60
[58] Field of Search ................................ 294/50.5–50.9, 294/53.5, 60; 111/92, 101, 106, 107

[56] References Cited

U.S. PATENT DOCUMENTS

| | | | |
|---|---|---|---|
| 68,903 | 9/1867 | Roberts | 294/50.8 |
| 192,282 | 6/1877 | Rhodes . | |
| 199,501 | 1/1878 | Bowman . | |
| 209,837 | 11/1878 | Ryan | 111/101 |
| 281,137 | 7/1883 | Rhodes | 294/50.8 |
| 715,260 | 12/1902 | Griffin | 294/50.8 |
| 931,061 | 8/1909 | Hardy | 294/50.8 |
| 1,548,040 | 8/1925 | Johnson . | |
| 1,576,969 | 3/1926 | Hackenberger . | |
| 2,014,311 | 9/1935 | Council . | |
| 4,813,728 | 3/1989 | Genser . | |

FOREIGN PATENT DOCUMENTS

| | | | |
|---|---|---|---|
| 249012 | 1/1964 | Australia | 294/50.8 |
| 21515 | 9/1905 | Austria . | |
| 578599 | 9/1924 | France . | |
| 742823 | 3/1933 | France | 294/50.8 |
| 333975 | 6/1936 | Italy | 294/60 |
| 724462 | 11/1966 | Italy | 294/50.8 |
| 853681 | 11/1960 | United Kingdom . | |

*Primary Examiner*—Johnny D. Cherry
*Attorney, Agent, or Firm*—Stephen R. Greiner

[57] ABSTRACT

A grappling-type shovel including a pair of semicircular blades pivotally secured together by a hinge. The hinge includes a pair of pivot plates extending from the inner surfaces of the blades. The pivot plates are joined together by a pivot pin. A pair of elongated handles are secured at their lower ends to the blades. A foot pedal is pivotally secured to the lower end of one of the handles.

5 Claims, 1 Drawing Sheet

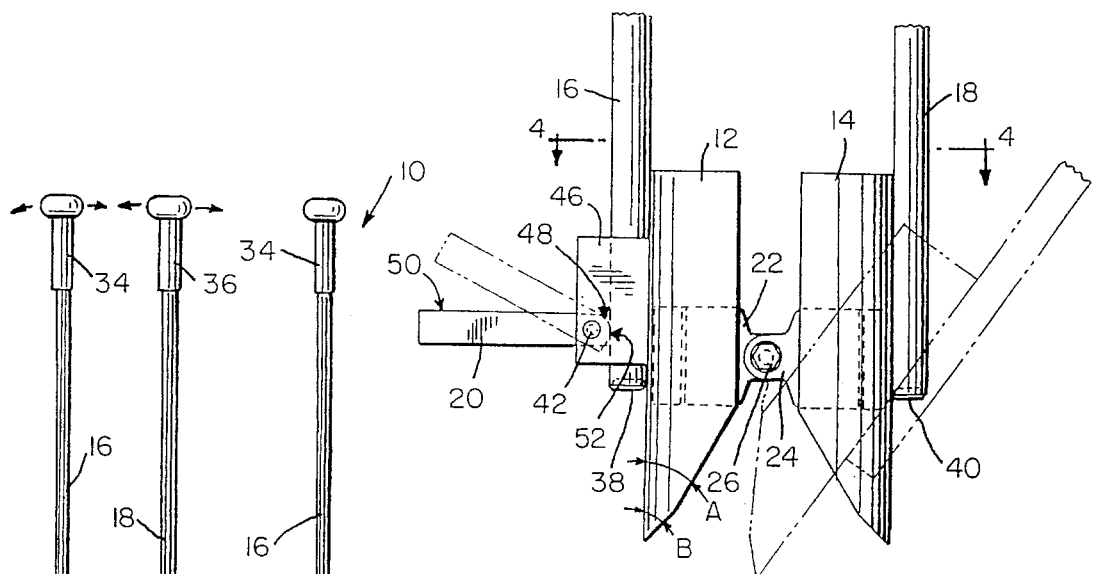
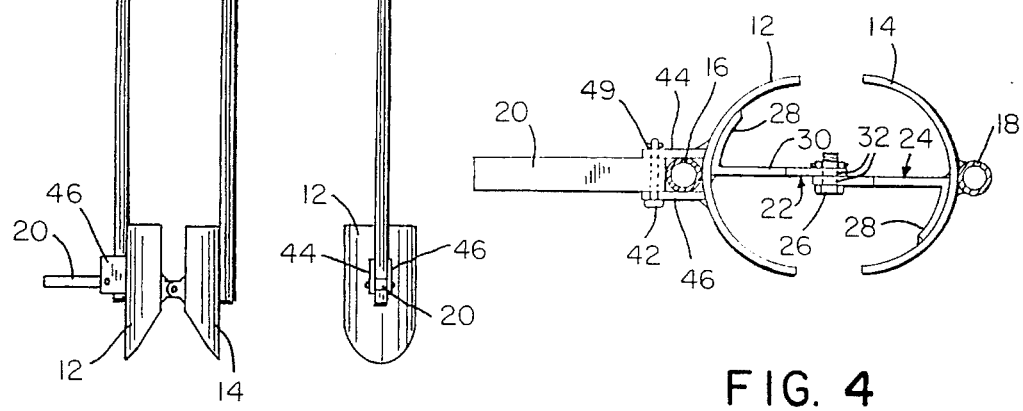

GRAPPLING-TYPE SHOVEL

FIELD OF THE INVENTION

The present invention relates generally to gardening tools and, more particularly, to a grappling-type shovel having a foot pedal hingedly secured thereto.

BACKGROUND OF THE INVENTION

Plants grown from bulbs, corms and tubers have very different internal structures but are alike in possessing a fleshy body from which roots are produced and in which food and water are stored. Due to this latter attribute, most have special cultivation needs. Thus, it has been a somewhat difficult task to establish and maintain a garden having such plants within it.

Crocuses, hyacinths, daffodils and tulips are all grown from bulbs or corms and their showy flowers appear annually when they are properly planted and provided with sufficient light and food. As is well known, their bulbs (or crocus corms) are typically bought dry and planted in small clusters or groups during the fall season. If not planted as soon as they are acquired, the bulbs will sprout and will probably fail to produce satisfactory flowers.

It is recommended by many plant specialists that bulbs should be planted in a confined space since they flower best when their roots are somewhat restricted. This confined space can be provided by digging a hole in the soil surface that is approximately 1.5 times the diameter of the bulb to be placed within it. In the alternative, multiple bulbs can be placed side-by-side in a somewhat larger hole.

Since most urban flower gardens only permit the use of hand tools in their confined work areas, excavating small holes can be grueling work often requiring a gardener to toil on his hands and knees for long periods of time. Thus, gardeners desiring to plant large numbers of bulbs typically must accomplish the task in several modest steps with frequent breaks between them. A need, therefore, exists for a device that will assist a gardener in excavating small holes in the soil surface for planting bulbs with rapidity and minimal physical effort.

SUMMARY OF THE INVENTION

In light of the deficiencies presented by gardening implements currently available in the marketplace, it is a principal object of the invention to provide a shovel capable of rapidly excavating small holes in the ground surface while its user remains standing in a comfortable, upright position.

It is another object of the invention to provide a shovel of the type described with a pair of blades adapted to be closed together in clamshell-like fashion to grasp and retain excavated soil material between the blades.

It is an object of the invention to provide improved elements and arrangements thereof in a shovel which is lightweight, inexpensive, dependable and fully effective in accomplishing its intended objects.

Briefly, the shovel in accordance with this invention achieves the intended objects by featuring a pair of semicircular blades pivotally secured together by a hinge. The hinge includes a pair of pivot plates, extending from the inner surfaces of the blades, which are joined together by a pivot pin. A pair of elongated handles are secured at their lower ends to the blades. A foot pedal is pivotally secured to the lower end of one of the handles.

In the preferred embodiment, the lower ends of the semicircular blades are each formed to include a pair of adjacent, planar, cutting surfaces arranged one above the other. The upper cutting surfaces of both blades are adapted for cooperative engagement with one another. The lower cutting surfaces, on the other hand, diverge from the first at a shallow angle and permit greater penetration rates through the soil.

The foregoing and other objects, features and advantages of the present invention will become readily apparent upon further review of the following detailed description of the preferred embodiment, as illustrated in the accompanying drawings.

BRIEF DESCRIPTION OF THE DRAWINGS

The present invention may be more readily described with reference to the accompanying drawings, in which:

FIG. 1 is a side view of a grappling-type shovel in accordance with the present invention.

FIG. 2 is a front view of the grappling-type shovel of FIG. 1.

FIG. 3 is side view of the shovel blades, enlarged to show details thereof.

FIG. 4 is a cross-sectional view taken along line 4–4 of FIG. 3 showing additional shovel blade construction details.

Similar reference characters denote corresponding features consistently throughout the accompanying drawings.

DETAILED DESCRIPTION OF THE PREFERRED EMBODIMENT

Referring now to the FIGS., a grappling-type shovel in accordance with the present invention is illustrated at 10. The shovel 10 includes a pair of cooperating, semicircular blades 12 and 14 of metallic construction pivotally connected together near their respective midpoints. Elongated handles 16 and 18, preferably made of metallic tubing, are secured by welds to the exterior, convex surface of the blades 12 and 14. Adjacent one of the elongated handles 16, a pivoting foot pedal 20 is provided for driving the blades 12 and 14 into highly compacted or consolidated soils with the foot of a user as will be described more fully below.

The blades 12 and 14 each comprise one-half of a hollow cylinder which has been truncated at its lower end so as to provide it with a pair of downwardly-facing, planar cutting surfaces. As shown, the upper one of the two cutting surfaces on each blade slopes upwardly and inwardly at a preferred angle (A) of approximately 30 degrees from vertical. The lower one of the two cutting surfaces of the blades 12 and 14 slopes in the same general direction, however, at a relatively greater angle (B) of approximately 45 degrees from vertical.

By outward movement of the upper ends of the handles 16 and 18, the upper cutting surfaces of blades 12 and 14 may be brought into cooperative engagement with one another to grasp and retain excavated soil material between the blades. The lower cutting surfaces of the blades 12 and 14, however, are prevented by their geometry from contacting one another regardless of the positioning of the handles 16 and 18. Nonetheless, the lower cutting surfaces are believed to offer the shovel 10 somewhat greater shovel penetration rates in typical, loamy, garden soils.

Metallic hinge members 22 and 24, joined by a bolt 26 at the point where they cross one another, pivotally connect the blades 12 and 14 together. As shown, each of the hinge members 22 and 24 preferably includes a curved mounting portion 28, adapted to be fitted flush against the concave interior surface of either blade 12 or 14 and welded thereto, as well as an integral, planar, blade connecting portion 30 extending therefrom. To permit the blades 12 and 14 to pivot through a wide angular range, the length of each connecting portion 30 (from the mounting portion 28 to the center of the bore 32 for receiving bolt 26 therein) is preferably greater than the blade radius.

Although the length of the handles 16 and 18 may be varied in accordance with need, they are preferably provided with a length that permits a user to conveniently grasp them near his waist while pressing the blades 12 and 14 into the ground with his foot on foot pedal 20. For added comfort and ease of handling the shovel 10, the upper ends of the elongated handles 16 and 18 are provided with rubberized handgrips 34 and 36. To prevent soil from undesirably entering into the handles 16 and 18, caps 38 and 40 are secured within the openings at the bottom ends of the handles.

The foot pedal 20 is preferably made from a single piece of metallic bar stock having a length sufficient to receive the foot of a user. As shown, the foot pedal 20 is pivotally secured to the shovel 10 by a pin 42 which projects through a pair of metallic hinge plates 44 and 46 welded in parallel fashion to opposite sides of the handle 16. A conventional cotter pin 49, secured to the free end of the pin 42, retains the foot pedal 20 on the shovel 10.

Adjacent the pin 42, the pedal 20 includes a curved portion 48 which connects its top and side surfaces, 50 and 52 respectively, which are positioned at right angles to one another. The curved portion 48 has a radius of curvature that is slightly less than the distance from the longitudinal axis of the pin 42 to the handle 16. Thus, the curved portion 48 permits the foot pedal 20 to rotate upwardly to a vertical orientation wherein its top surface 50 may be positioned adjacent the handle 16 for storage. When rotated downwardly for use, however, the planar side surface 52 of the foot pedal 20 abuts the handle 16 and retains the foot pedal at a right angle to the handle 16 and adjoined blade 12.

In use, the handles 16 and 18 are employed to press the blades 12 and 14 into the soil surface at a specified location until the pivot bolt 26 is positioned at or slightly beneath the soil surface. Should the soil be found to be well consolidated, the foot pedal 20 may, of course, be pressed by the foot of a user to drive the blades 12 and 14 to the specified depth. The upper ends of the handles 16 and 18 are then moved outwardly such that the lower ends of the blades 12 and 14 squeeze the soil positioned beneath them. Next, the handles 16 and 18 are lifted to excavate the soil trapped between the blades 12 and 14 thereby leaving a cylindrical hole in the soil surface. After positioning one or more flower bulbs in the cylindrical hole, the excavated soil in the shovel 10 may be discharged back into the hole to bury the bulb. The entire planting process requires only a few seconds to complete.

While the invention has been described with a high degree of particularity, it will be appreciated by those skilled in the art that numerous modifications and substitutions may be made thereto. Therefore, it is to be understood that the present invention is not limited to the sole embodiment described above, but encompasses any and all embodiments within the scope of the following claims.

I claim:
1. A grappling-type shovel, comprising:
   a pair of semicircular blades each having a concave inner surface and a convex outer surface, each of said blades also having a first, planar cutting surface which, when said blades are pivoted by the outward movement of the upper ends of a pair of handles, may be brought into cooperative engagement with one another to retain excavated material between said blades, each of said blades further having, at the bottom thereof, a second cutting surface diverging from said first cutting surface;
   a hinge pivotally securing said blades together, said hinge including a pair of pivot plates extending from said concave inner surfaces of said blades and a pivot pin joining said plates
   a pair of elongated handles having upper and lower ends, said elongated handles being secured at their lower ends to said blades and,
   a foot pedal pivotally secured to the lower end of one of said handles.
2. A grappling-type shovel, comprising:
   a pair of semicircular blades each having first and second planar cutting surfaces, said first planar cutting surfaces adapted to be brought into cooperative engagement with one another to retain excavated soil material between said blades, and said second planar cutting surfaces angularly diverging from said first cutting surfaces at the bottom of said blades;
   a hinge pivotally securing said blades together, said hinge including a pair of pivot plates extending from said blades and a pivot pin joining said pivot plates; and,
   a pair of metallic tubular handles having upper and lower ends, said handles being welded at their lower ends to said blades.
3. The grappling-type shovel according to claim 2 further comprising a foot pedal pivotally secured to the lower end of one of said handles.
4. The grappling-type shovel according to claim 2 further comprising:
   a pair of mounting plates secured to opposite sides of one of said handles and extending outwardly therefrom; and,
   a foot pedal pivotally secured between said mounting plates, said foot pedal having a curved upper surface adjacent its associated handle for allowing said foot pedal to be pivoted upwardly to a storage position or to be pivoted downwardly to an operative position orthogonal to the handle.
5. A grappling-type shovel, comprising:
   pair of semicircular blades each having first and second planar cutting surfaces, said first planar cutting surfaces adapted to be brought into cooperative engagement with one another to retain excavated soil material between said blades, and said second planar cutting surfaces angularly diverging from said first cutting surfaces at the bottom of said blades;
   a hinge pivotally securing said blades together, said hinge including a pair of pivot plates extending from said blades and a pivot pin joining said pivot plates;
   pair of elongated handles having upper and lower ends, said elongated handles being secured at their lower ends to said blades; and,
   foot pedal pivotally secured to the lower end of one of said handles.

* * * * *